United States Patent [19]

Bien et al.

[11] 4,053,233

[45] Oct. 11, 1977

[54] RETROREFLECTORS

[75] Inventors: Fritz Bien, Arlington; Morton Camac, Lexington; Michael Elliot Gersh, Bedford, all of Mass.

[73] Assignee: Aerodyne Research, Inc., Bedford, Mass.

[21] Appl. No.: 667,035

[22] Filed: Mar. 15, 1976

[51] Int. Cl.² ............... G01B 11/26; G01D 21/04; G02B 5/12

[52] U.S. Cl. ............... 356/141; 116/124 R; 340/258 B; 350/98; 350/100; 350/102; 350/298; 350/299; 356/152

[58] Field of Search ............... 356/152, 141; 350/299, 350/298, 102, 100, 98, 97; 340/258 B; 116/124 R; 250/199; 358/103

[56] References Cited
U.S. PATENT DOCUMENTS

| | | | |
|---|---|---|---|
| 1,813,874 | 7/1931 | Eskilson | 350/102 |
| 2,604,644 | 7/1952 | Tilton | 350/102 |
| 3,540,801 | 11/1970 | Schmidt | 350/102 |
| 3,577,561 | 5/1971 | Oshima et al. | 350/98 |
| 3,611,277 | 10/1971 | Yoder | 250/199 |
| 3,705,955 | 12/1972 | Assouline et al. | 358/103 |
| 3,741,653 | 6/1973 | Svetlinchny | 356/141 |
| 3,863,064 | 1/1975 | Doyle et al. | 250/199 |

Primary Examiner—S. C. Buczinski
Attorney, Agent, or Firm—Alfred H. Rosen; Frank A. Steinhilper

[57] ABSTRACT

A system is disclosed for detecting, locating and monitoring floating objects and other subject matter at sea on another body of water or in other location of difficult access. A floating unit contains several retroreflecting elements and is placed at a location where detection is desired. For example, rescue or monitoring can be facilitated by detecting the floating unit from the air. Detection may include air borne signal apparatus such as a scanning laser beam or ordinary light source and air borne detection apparatus for detecting and analyzing a reflected signal.

2 Claims, 4 Drawing Figures

RETROREFLECTORS

BACKGROUND OF THE INVENTION

It is frequently desired for one purpose or another to detect, locate or monitor something in the ocean or on another body of water for example, it is frequently necessary to rescue people adrift in the ocean after a shipwreck or an airplane going down at sea. It is also frequently desired to measure currents or to monitor some other sea activity. Similarly, it is often necessary to locate or monitor objects on land; for example, air crashes at remote land locations are frequently at least as difficult to find as those in the ocean.

These various activities have been hampered by the fact that things adrift in a wide expanse of water are particularly hard to locate especially when active communication cannot proceed. Some of the steps which have been taken in the past toward location of people or objects at sea or on another body of water have included providing lights such as hand-held flashlights or beacons or oral radio communication so that the article at sea can be detected from a great distance. Special dyes have been employed to color the water and make a specific location more highly visible. For measuring currents over long distances, radio beacon communications to satellites are sometimes used, but it is not usual to avoid completely the effort to trace a floating object and simply to measure, for example, the salinity of the water and thus to trace a current back to a source. Measurements such as these, although not fully satisfactory, are in general use simply because on a hard, practical basis they represent the best there is.

One embodiment of present invention relates to an improved way of detecting, locating, monitoring or otherwise finding and keeping track of an object at sea or on another body of water. A floating object bearing a plurality of retroreflectors, sometimes known as corner reflectors, is placed in the water where it can be detected by the fact that it returns a beam of light or radiation at essentially 180° reversal of path. Corner reflectors are known in the art, and taken alone, do not represent this invention. The floating object acts as a passive component in an entire system which can include means to send out a radiation signal to permit its detection by logic apparatus, so that the detection and location can, if desired, be automatic. For example a laser beam may be scanned across the surface of the water by suitable means and the reflective signal picked up and compared against the scanner signal which is being transmitted.

One of the advantages of the present system is that the reflected signal can be positively identified so as to eliminate interference or confusion resulting from random reflection of light from the ocean surface. It can detect and identify the specific components from a relatively great distance either at night or during the day, and needs no positive cooperation from people or apparatus at the sea location except for merely launching the reflector at the initiation of the need for detection. Even the initial launching can be automatic. For example, a plurality of the floating reflectors according to this invention can be releasably secured to the outer surface of an airplane on an overwater flight so that on landing at sea these floating reflectors are torn loose and thereupon float in the water to provide a basis of detection and sea rescue.

The reflector according to a preferred embodiment of the present invention comprises floating a head substantially lighter than water, with a ballast member secured thereto to cause the head to bob on the surface of the water in a predictable upright position. Positioned on the upper surface are a plurality of retroreflector elements arranged to provide reflection back to the source and covering a 360° horizontal angle. The reflectors can cover the angle of the sky virtually or if need be, completely from horizon to horizon, so that a light signal received from any position above the surface of the water will be reflected back on itself, or, in one embodiment an angle of about 60° from the vertical is covered. There is relative freedom of design to position the reflectors on the floating head so as to cover the entire sky or only a part of the sky, and one embodiment of the invention covers the sky area above an angle of about 30° from the horizontal in cooperation with search means to detect the reflectors from a flying airplane which does not require detection from a point near the surface of the sea. In this embodiment of the invention, four reflectors are positioned on the upper device surface spaced 90° from each other and inclined at an angle from the horizontal, such as about 30°. The surfaces or facets in which the reflectors are mounted may be inclined at this angle, or the reflectors may be tipped or wedged at the desired angle. The retroreflector elements, and desirably also the surface or member, have hydrophobic surfaces either as a result of their composition or as a consequence of surface treatment or surface coating.

According to another embodiment of the invention the individual reflector units may be secured to or mounted on an object which is itself the subject of a search. For example, for detection of people lost at sea as a result of an airplane going down at sea, the reflector units may be secured to or mounted on a raft or other rescue device or on clothing or other articles worn by airplane occupants. For example, a pilot's helmet may have one or more reflector units mounted thereon.

Cooperating with the floating reflector of FIG. 1 or FIG. 3 is a base station which may be, and generally is, carried in an airplane to permit rapid covering of an extremely wide ocean area. According to a preferred embodiment, a laser beam generated in an airplane is reflected by a rapidly rotating mirror to scan the ocean. Such laser beam scanning equipment is known and is commericially available. Detection means also at the base station receives the reflected beam and analyzes it in a logic system. Desirably, the scanning rate is such that several scans of the beam pass across a floating reflector as an airplane flies across. When the signal-receiving means on the airplane records the reception of a pulsed signal of correct type and sequence, it is ascertainable that it is different from a random signal. As will be seen hereinafter, the system operates quite effectively from an airplane flying as high as 10,000 feet, weather permitting; greater altitude may be employed provided the equipment is adapted to operate with a weaker reflector signal. Ordinarily for sea rescue it may be preferred to operate from a position below 1,000 feet in order to take full advantage of a strong signal.

At the present time, it is intended that the system operate with relatively inexpensive continuous-wave lasers emitting in near infrared light ranges, but if desired, the system can operate with a visible, infrared or ultraviolet signal or other signal which can be reflected back on itself. Ordinary light sources rather than lasers may be used, but apparatus complications may more than outweight the savings in cost from the less expensive light source.

The system can be operated with a base station aboard ship or for some purposes with a land base station.

The nature of the invention is more fully illustrated in the drawings in which.

SPECIFIC DESCRIPTION OF THE INVENTION

Figure 1:
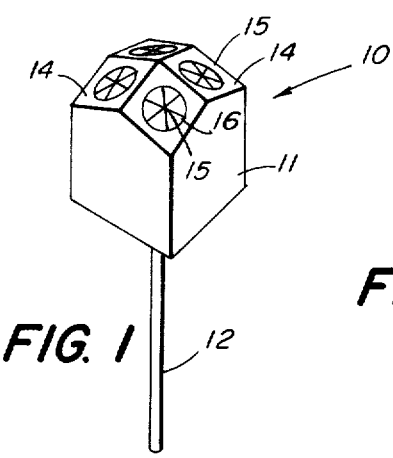
FIG. 1 is an upper perspective view of a floating retroreflector unit according to one embodiment of the invention.
Figure 2:
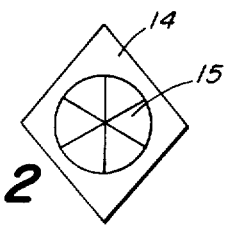
FIG. 2 is a plan view of a facet of the unit shown in FIG. 1.

In FIG. 1 is shown a passive reflector system generally designated 10 comprising a floating head 11 and a ballast member or ballast pin 12 secured to and descending therefrom. The upper surface of head 11 is cut into four segments or faces 14 in each of which is a retroreflector 15 set in a recess 16 and secured therein by a suitable or binder. In the first prototype as built, the binder was an epoxy cement.

In a presently preferred embodiment of the invention, the faces 14 on the upper surface of head 11 are of regular shape and are disposed around the head at regular 90° angles from each other. These faces 14 are inclined at an angle of 30° from the horizontal, thus promoting drainage of water or spray from the surface and also aiming the retroreflectors around a 360° circle. As long as the passive reflector system 10 remains reasonably upwards in its orientation, it can receive a signal from virtually all directions and reflect it back on itself. In particular, it is adapted to receive and reflect a signal from an airborne search means as will be set forth hereinafter.

The retroreflectors 15 are set in a facet 14 in the floating head at a 30° angle from horizontal to give the flatest response with respect to scan angle. The reflectors generally return a signal at greater than 80% of the reflectivity for a beam received nearly normal to one retroreflector. At a 45° angle from the vertical the reflectivity is about half the signal return from a beam directly normal to the retroreflector surface.

The presently preferred form of the floating reflector 10 as shown has four retroreflectors positioned around the surface inclined downwardly at 30° from the horizontal. More than four may be used; with more retroreflectors there is a greater chance of a very strong signal. Fewer can be used; with less than three there is a greater chance that a signal beam may pass the floating reflector at an unfavorable angle and the reflected beam not be detected. Similarly, the degree of inclination of the reflector surface, 30° in the devices illustrated in the drawing, should be steep enough for water or spray to run off and flat enough to be visible and reflective over a wide search angle. Inclination between about 20° and about 50° generally is most practical, and the reflectors can be mounted at the same angle as the surfaces in which they are mounted or may be wedged or otherwise inclined at a greater or lesser angle, or optically wedged by means of an optical prism.

The retroreflectors 15 are of conventional structure, having a flat outer receiving surface and a retroreflecting rear surface formed at 90° angles with respect to adjacent rear surfaces. The retroreflectors used had reflecting angles of 90° with an accuracy of ±0.006°. Such retroreflectors can be made from glass or quartz by routine production techniques. Retroreflectors of Plexiglas or other acrylic plastic materials can be made relatively inexpensively provided care is taken to issure accurate retroreflective structure. With accuracy of about ±0.0001 radians or +0.006°in the individual retroreflectors 15, and a reflector size of about 0.3 cm., the passive reflector system 10 can be detected from an airplane at an altitude which may be as much as 10,000 feet by reflection of a 1 watt laser carried by the airplane. For best reliability, larger reflectors, more powerful lasers, or lower altitudes are preferred.

The retroreflectors 15 can operate under some conditions by total internal reflection, but it is usual to vacuum coat the reflecting surfaces with aluminum or to coat the surfaces otherwise with a reflective material.

It is preferred to coat the surface of head 11 and the retroreflectors 15 with an antiwetting or hydorphobic coating, and a wide variety of coating materials have been used and tested including several silicone materials, a chlorinated silane, several fluorinated polymers, and other materials. One presently preferred material is a chlorinated silane hydrophobic coating material available under the name SC-87 Dri Film from General Electric Company; Silicon Products Division. In one test, effectiveness was confirmed by spraying the surface with perfume atomizer loaded wih sea water. Suitability was determined by observation to see that water rapidly drained off the surface and was checked by retroreflection of a laser beam. Spraying was repeated every several second and the surface was held at its normal angle of 30° tilt. Using the preferred coating composition, in no case was there zero retroreflection and in virtually all cases there was at least 30 percent useful retroreflection. As a screening test to select useful coating materials, an acrylic sheet coated with the hydorphobic material, a droplet of sea water of measured volume was placed on the coated suface and the surface tipped until the drop started to move. With drop volumes from about 1 microliter to about 30 microliters, SC-87 "Dri Film" showed that the drop began to move at a tilt angle of about 6°, whereas the uncoated acrylic resin showed that this same motion started at about 48°.

The head 11 of the retroreflector system is a light weight floating material. One material employed was a cast, epoxy syntactic foam. Other suitably light materials can be employed for this purpose. The head should float well above the water and support the ballast pin 12 and the retroreflectors 15. A density or specific gravity less than about 0.5 is desirable, and the material should be strong and durable so as to float indefinately in sea water. The passive reflector system 10 floats well above the surface of the water, held upright with excellent stability. In non-braking waves the system bobs up and down with the water. Breaking waves will cover the surface, washing the surfaces clean to fully reflective condition, free from spray. Foam deeper than about ¼ inch will temporarily cover the unit, again washing the unit.

Figure 3:
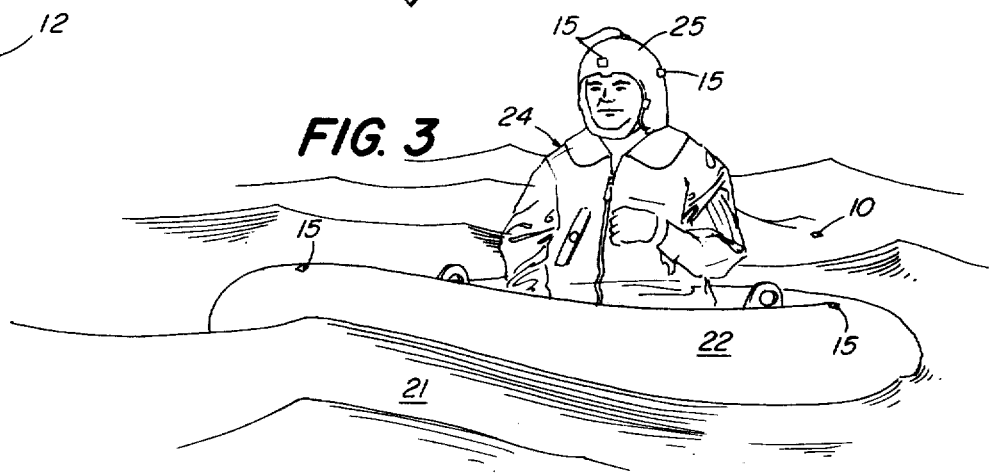
FIG. 3 is a perspective view of a reflector elements on apparel of a person at sea according to another embodiment of the invention.

In FIG. 3 is shown an embodiment of the invention in which a plurality of reflectors 15 are mounted on a floating object which floats not necessarily of its own bouyancy but as a consequence of being carried in turn on a floating object. As illustrated in the figure, there is on the ocean surface 21 a primary floating object such as for example, a raft 22. Such a raft may, for example, be an emergency raft or inflatable raft, or the like, carried by ship at sea or by an airplane engaged in overwater flight. As depicted, a person or passenger 24 on the raft may, for example, be an airplane pilot. The person 24 wears a helmet 25 on which are mounted several reflectors 15. For example, as illustrated, four individual reflector units 15 may be disposed around helmet 25, preferably at regularly spaced locations about 90° from each other. As illustrated in the figure, these reflector units are positioned on the sides of helmet 25; they desirably are wedged at an angle of about 30° from the horizontal; optionally a central reflector 15 is also positioned near the top of the helmet 25. When the helmet is worn on the head of the man in the raft the reflectors are positioned to receive and reflect a signal from a search station in the same manner as with the floating head 11 and will be properly directed for signal reflection despite normal motion by the wearer of the helmet.

Figure 4:
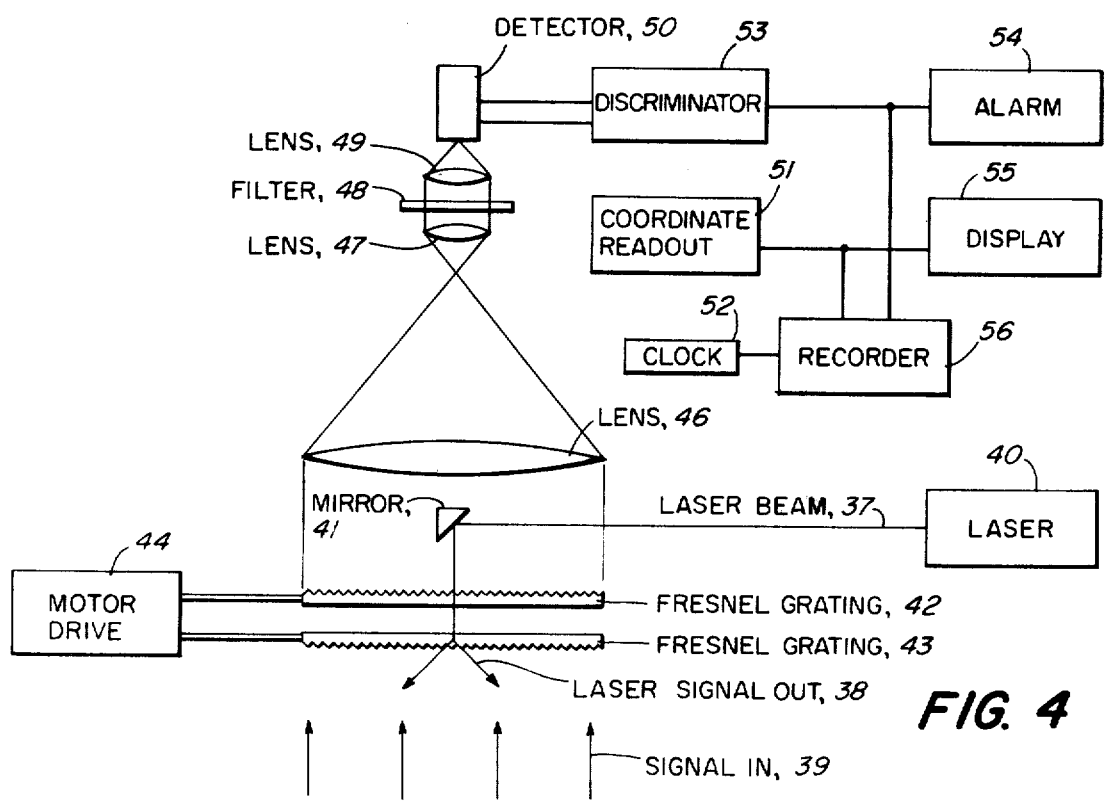
FIG. 4 is a block diagram of location and detection means operating in conjunction with the devices of FIGS. 1 to 3.

In FIG. 4 there is shown in outline and in block diagram apparatus for sending and receiving a signal according to one embodiment of the invention. A laser 40 or similar light emitting source is positioned adjacent to a mirror 41. Below mirror 41 is a first fresnel grating 42 and a second fresnel grating 43. A motor drive 44 is mounted and adapted to rotate fresnel grating 42 and fresnel grating 43 in counterrotational directions. As illustrated, a laser beam 37 from laser 40 strikes mirror 41 and is reflected through fresnel grating 42 and fresnel grating 43. Not shown in FIG. 4 is a light shield surrounding the laser beam 37 and the mirror 41 to stop laser light scattered from optical elements from entering the detector. As a consequence of rotation of these gratings in opposite directions, a laser beam or signal 38 emerges from fresnel grating 43 and moves back and forth in a scanning mode.

Positioned above fresnel grating 42 and above mirror 41 is a first lens 46 adapted to receive an incoming reflected laser beam signal 39. A lens system comprising lens 47 and lens 49 includes a light wavelength selective filter 48 positioned between lens 47 and lens 49 and is adapted to focus the laser beam signal 39 on a detector 50. The detector 50 is a photomultiplier or a photoresponsive device sensitive in the spectral range of the beam emitted by laser 40. The laser 40 may, for example, be a near infrared laser in which case detector 50 is responsive to the near infrared.

A coordinate readout 51 is adapted to receive a signal from light detector 50 and in addition to receive a timing pulse from a clock 52 or from other source of information regarding time or geographical position. A discriminator 53 is adapted to receive a signal from light detector 50 and matches this signal with an input signal corresponding to grating rotation speed. When the discriminator receives an input signal of proper pulse pattern, it designates a reflection of beam 38 as distinguished from a random signal. This discriminator 53 thereupon signals an alarm 54, a display device 55 and a recorder 56.

The system as described is useful in connection with detecting and locating a position at sea or land from a flying airplane, and in such case the laser transmitting and detecting system of the sort, for example, illustrated in FIG. 4 is carried in a search airplane flying through a search area. Ordinarily, the plane will fly at a desired altitude such as between about 1,000 feet and about 10,000 feet, depending on meteorological conditions at the time of the search. Lower altitudes can be used but will require more frequent passes by the plane; higher altitudes can be used under favorable atmospheric conditions. Ordinarily, the transmitted signal beam will be aimed directly down or forward at an angle less than about 30° from the vertical and the scanning rate will be such that several scan lines strike the floating retroreflector as the plane passes. When search over water is being conducted, a floating reflector, in FIG. 1, may be used or other means may be employed, as in FIG. 3, to keep the reflector units 15 above the surface of the water; when search over land is being conducted floating is not necessary and what is required is that at least one reflector unit 15 be sufficiently clear from obstruction and aimed sufficiently upward so as to receive and reflect a signal.

We claim:

1. A system for detecting and locating an objective on the surface of a body of water, comprising:

a floating reflective marker having a floating head characterized by being substantially lighter than water, a ballast member secured to said head and dependant therefrom, said ballast member acting with said head to cause the assembly to ride upright in rough or smooth water, the head and ballast member thereby floating upright in water with the upper surface of said head riding above the surface of the water, an upper surface of said head having portions inclined from the horizontal and visible from positions above and laterally removed from said head, a plurality of retroreflectors mounted in said upper surface and distributed angularly around said surface, said retroreflectors having front surfaces to receive a radiation signal and right angled rear reflective surfaces to reflect impinging radiation back at 180° angle from incoming radiation, the front of said retroreflector having at least its surface composed of a hydrophobic material to shed water therefrom, a base station, a source of directed radiation at said station, scanning means to sweep said radiation across an area at a scan rate to cause at least three scan lines of radiation to pass across an area of the size of said floating retroreflector, detection means at said base station to detect radiation reflected from said retroreflector, and signal means to signal the detection of said reflected radiation.

2. A method for detecting and locating a person on the surface of a body of water comprising:

positioning on said person an article of apparel having a plurality of retroreflectors mounted in an upper surface thereof and distributed angularly around said surface, said retroreflectors having front surfaces to receive a radiation signal and right angled rear reflective surfaces to reflect impinging radiation back at 180° angle from incoming radiation, directing from an airplane radiation scanned across an area at a scan rate to cause at least three scan lines of radiation to pass across an area of the size of said retroreflectors, receiving and detecting at said airplane radiation reflected from said retroreflectors, and deriving a signal from said reflected radiation to denote the presence of said retroreflectors.

* * * * *